Aug. 19, 1958  G. B. MORRIS  2,847,836
TORQUE LIMITING CLUTCH
Filed Oct. 22, 1956

INVENTOR.
GLEN B. MORRIS
BY
Moody & Hatcher
ATTORNEYS

United States Patent Office 2,847,836
Patented Aug. 19, 1958

2,847,836

TORQUE LIMITING CLUTCH

Glen B. Morris, Marion, Iowa, assignor to Collins Radio Company, Cedar Rapids, Iowa, a corporation of Iowa Application October 22, 1956, Serial No. 617,346

6 Claims. (Cl. 64—30)

This invention relates in general to clutch systems and more particularly to torque limiting clutch arrangements.

Prior to this invention, means to limit the torque delivered to a load have involved establishing a power train through a clutch shoe elastically engaging a cooperating drum. As increasing torque sets up a bending in the shoe due to the elastic character of the clutch shoe, the friction force due to the engagement lowers and the shoe begins to slide relative to the drum. While new, this arrangement affords a reasonably good torque limiting device. As the system gets older, however, dirt collected on the clutch shoe begins to increase the value of the torque limited until four or five times as much torque is required to actuate the torque limiting effect. Other undesirable aspects, such as reliability and stability, are adversely affected. Variations in materials offer only slight improvement.

Accordingly, it is the object of this invention to provide a torque limiting clutch arrangement which is stable as to the torque limited throughout the entire life of the clutch.

It is a further object of this invention to provide a clutch which transmits torque bidirectionally with great stability as to the torque value limited.

It is a feature of this device that it is small and compact relative to its capabilities and is easy to construct.

It is a further feature of this device that it is not critical as to materials used in the friction surfaces.

Further objects, features, and advantages of the invention will become apparent from the following description and claims when read in conjunction with the drawing in which:

Figure 1:
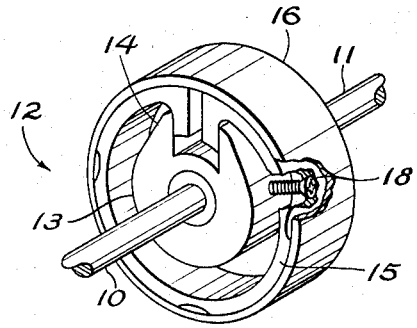
Figure 1 shows a step in the development of the invention.

In Figure 1 an input shaft 10 is coupled to a coaxial output shaft 11 by a clutch arrangement 12. In this arrangement a hub 13 has two radial prongs 14. Mounted with the ends of its shape engaged between the prongs is an elastic clutch shoe 15 in the form of a C. The ends of the C are turned inward radially forming ears which engage the outwardly projecting prongs 14. External to the clutch shoe 15 is a drum 16. Hub 13 is mounted fixedly on shaft 10, while drum 16 is attached to shaft 11 for power transmission thereto.

In operation, an input motion is applied to shaft 10. This rotation is transmitted to clutch shoe 15 by prongs 14. Assuming the torque load of shaft 11 is below the limit value, the torque is then transmitted to the drum from the clutch shoe. Thus is the unlimited torque train.

As the load on shaft 11 increases, the trailing prong 14 of the hub drives the ear of clutch shoe 15 hard enough to make the shoe deflect elastically inwardly away from the drum 16 under the friction load. At this level of torque the clutch shoe is shrunk slightly by the driving torque to lessen the friction until the shoe slides on the drum; as the torque load is relieved slightly by the slipping, the shoe expands to provide more pressure, more friction, and more torque transmitted. An equilibrium arises between the friction available and the torque delivered to the load.

As the clutch of Figure 1 ages, wear produces dust and a polished surface on drum 16. With the arrangement of Figure 1 described above, the torque limited is sensitive to temperature variations, dirt, speed, and other factors which are undesirable in their effect on the torque value limited.

In the partial solution to the problem a screw 18 is used to restrict the clutch shoe in its motion. Screw 18 holds the shoe away from the drum on the trailing end of the clutch shoe, assuming for the moment a clockwise rotation of shaft 10. Then the prong 14 drives the leftmost ear of clutch shoe 15 and through it, drum 16. As the torque value to be limited is approached, screw 18 holds the opposite end of the shoe away from the drum and concentrates the force of shrinking the shoe away from the drum on the leftmost end. While this has some beneficial effect in making the torque value limited more reliable, this is not a complete answer. Further, the torque limiting is unidirectional rotationally in effectiveness.

Figure 2:
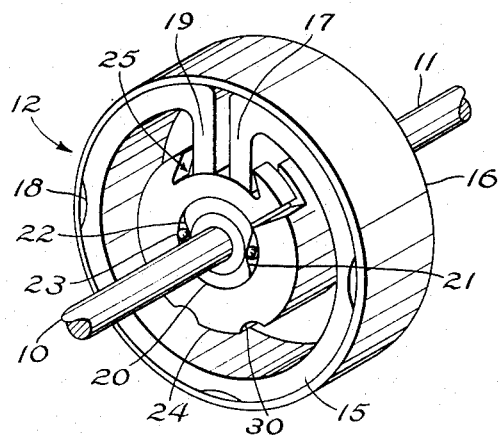
Figure 2 shows the invention assembled.

In Figure 2 an input shaft 10 is coupled to a coaxial output shaft 11 by the new clutch arrangement 12. The output side of the clutch is the same as in Figure 1 using drum 16 coupled to shaft 11. The input side, however, uses only the same shape clutch shoe 15 as before. Shoe 15 has a C-shape with a natural size slightly larger than the inside diameter of the drum 16. Thus, when shoe 15 is inserted within drum 16, it expands elastically against the drum. The elasticity of the shoe is adjusted by its unloaded shape and by relief notches 18. The elastance is set at such a level as to provide friction between the clutch shoe and the drum great enough to transmit a torque load greater than the values to be limited. At the ends of the C of clutch shoe 15 are two ears 17 and 19 which are actually the ends of the C turned inward substantially radially. A clearance between the ends of the C is necessary to permit the shoe to be compressed to completely clear the inner bore of the drum 16.

Mounted on shaft 10 is a hub 20 having a number of segments 21 and 22 removed therefrom. The shape of these segmental cam surfaces is somewhere between flat and epicycloidal as shown but is symmetrical with respect to rotation from a point which permits the rolling means running on these cam surfaces to be in a central rest position as illustrated. The rolling means 23 may be rollers or balls; for extremely high loads, rollers are more desirable for withstanding the forces involved.

External of the hub radially but coplanar therewith is an acuator ring 24. Actuator ring 24 rides on the rolling means 23 directly and couples the hub 20 to the clutch shoe 15 for transmission of torque. The actuator ring 24 is substantially cylindrical on its inside bore with rollers used as the rolling means 23. Some method of retaining the rollers, if necessary, is provided by such as a flat washer to prevent endwise drifting of the rollers. For use of balls an arcuate depression along the circumference of the bore will retain the ball against endwise loss and yet provide it with a race in which to roll for rotation of the hub 20 relative to the actuator ring 24.

Externally, the actuator ring need only to be small enough to clear the clutch shoe 15. While it is shown substantially cylindrical, it has also means such as slots 30 extending across the bight for the purpose of establishing the elastic characteristic of the actuator ring. This elastance, coupled with the elastance of brake shoe 15, establishes the torque limited value transmitted by the system.

The actuator ring 24 is coupled to the clutch shoe 15 by means of a cross slot 25 into which the ears 17 and 19 of the clutch shoe 15 engage. The cross slot 25 is more easily seen in Figure 3 whereby the actual coupling to the shoe will be readily understood.

Figure 3:
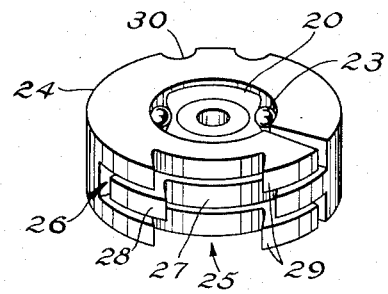
Figure 3 shows the actuator ring in a different view from that of Figure 2.

In Figure 3 hub 20 has between it and actuator ring 24 the rolling coupling means 23. The actuator ring is generally C-shaped in nature. As discussed before, the bight of the C has notches 30 in it transverse to the plane of the C to establish the elastic characteristic of the shape. At the ends of the ring an interlinked arrangement is formed by slotting one end at 26 and by extending the other end in a tongue-like projection 27. The cross slot extends across the three members thus formed and is transverse to the ends on the outer perimeter of the actuator ring.

While the cross slots in the interlinked ends substantially line up, the hooks formed at the outer ends of each end of the actuator ring, 28 on tongue 27, and 29 on the slotted end, establish the effective working width of the cross slot. These hooks bear against the ears 17 and 19 on assembly. Since these hooks are closer together and bear on the inwardly projecting ears 17 and 19, the spacing of the ears, the size of the shoe, and thus the friction available are directly controlled thereby.

In view of the balanced, interlinked arrangement the motion coupled through to clutch shoe 15 from actuator ring 24 does not cock or tilt the shoe out of the plane of the actuator ring. This makes the mechanism more stable and the operation is thus more reproducible.

In operation, shaft 10 is driven. Rolling means 23 couple hub 20 to actuator ring 24. Rotation of hub 20 couples motion into actuator ring 24 to drive it in rotation. The hooks 28 or 29, in accord with whichever direction shaft 10 is driven, drag along clutch shoe 15 in that direction.

Assuming the torque load is below the limited value, the friction forces of which the clutch is capable of transmitting from clutch shoe 15 to brake drum 16 are unchanged by the torque load. Clutch shoe 15 fully engages drum 16 to transmit the torque applied to the ear 17 or 19 engaging the hook 28 or 29. The power train thus is shaft 10, hub 20, roller means 23, actuator ring 24, hook 28 or 29, ear 17 or 19, shoe 15, drum 16 to output shaft 11.

As the limited torque value is approached, the drag of the load causes rolling means 23 to begin roll up the incline of the segmental cam surfaces. As the hub rotates relative to the actuator ring, the roller means climbs up the cam surface to either side of the central or neutral position, and the actuator ring 24 is expanded. This expansion brings together the hooked ends 28 and 29 and thus squeezes together the ears 17 and 19 of the clutch shoe. Thus, as the ring is expanded, the clutch shoe 15 is shrunk slightly. As the torque load increases, the elastance of the shoe and the actuator ring combined resist shrinking and expansion, respectively, to impede relative rotation of hub 20 with respect to actuator ring 24. At the torque level where the torque transmitted is limited, the cam or hub 20 has rotated to such a degree that actuator ring 24 squeezes ears 17 and 19 together to lower the available friction force between shoe and drum for torque transmission, with an equilibrium state arising limiting the friction force to that equal to the torque then being transmitted.

In this equilibrium state, an incremental torque added rotates hub 20 slightly more, expands actuator ring 24 a slight amount more, making clutch shoe 15 a slight amount smaller to reduce the friction between it and drum 16 to a value below that which will support the incremental torque applied. As this happens, clutch shoe 15 slides within drum 16. The sliding relieves the expansion of the actuator ring because of the lessened torque and the actuator ring permits the clutch shoe to expand slightly, increasing the friction available for greater torque. This actuation immediately assumes an equilibrium such that for applied torques greater than the torque limited value to which the mechanism is set, the actuator ring assumes an average size setting an average size for the clutch shoe which permits a friction force equal to the torque limited value to be transmitted.

This is achieved a torque limiting clutch which is reliable as to the torque limited, despite large amounts of wear of the components, as well as being stable with regard to temperature, speed, and other variations.

It is to be noted that the components lend themselves readily to ease of manufacture. The clutch shoe 15 can be an extrusion cut off transversely according to the width of the shoe. The drum 16 can be a stamping. Actuator ring 24 can be made from straight bar stock and formed while being bent over a mandrel. Hub 20 can be an extrusion pinned to shaft 10 or can be formed by machine work on an enlarged portion of said shaft.

Actuator ring 24 and brake shoe 15 are best made of beryllium copper hardened to the proper degrees for their respective purposes. Drum 16 of stainless steel and the camming hub 20 of hardened stainless steel offer satisfactory service. The rolling means 23 is of hardened steel.

Although this invention has been described with respect to particular embodiments thereof, it is not to be so limited therein because changes and modifications may be made therein which are within the full intended scope of the invention as defined by the appended claims.

I claim:

1. A clutch comprising a drum having an internal cylindrical surface, a clutch shoe within said drum resiliently contacting said surface, an input hub, said hub having cam surfaces, actuator ring means coupling said cam surfaces to said clutch shoe said actuator ring means controlling the friction loading between said clutch shoe and said surface, whereby torque applied to said hub is limited in magnitude in its transmission to said drum.

2. A troque limiting clutch comprising rotatably mounted coaxial input and output shafts, a hub having cam surfaces mounted on said input shaft, rolling means, actuator ring means surrounding said hub, said actuator ring means being in contact with said rolling means so as to be coupled to said cam surfaces, a drum mounted on said output shaft, a clutch shoe coupled to said actuator ring means and engaging said drum, said actuator ring means controlling the friction loading between said clutch shoe and said drum, whereby a limited predetermined torque load is transmitted by said clutch.

3. A torque limiting clutch comprising coaxial rotatably mounted input and output shafts, cam means mounted on said input shaft, actuator ring means, said actuator ring means being coupled to said cam means, a drum mounted on said output shaft, said drum having a cooperating clutch shoe, means coupling said actuator ring means to said clutch shoe for controlling the friction loading between said clutch shoe and said drum, whereby a limited predetermined torque load is transmitted by said clutch.

4. A troque limiting clutch comprising coaxial rotatably mounted input and output shafts, cam means mounted on said input shaft, said cam means being symmetrical with respect to the rotation of said input shaft, actuator ring means, said actuator ring means having a predetermined elastance, rolling means coupling said cam means to said actuator ring means for transmission of torque thereto, a clutch, said clutch comprising a friction surface and a clutch shoe, said friction surface being mounted on said output shaft, means coupling said actuator ring means to said clutch shoe for transmission of torque thereto, said actuator ring means controlling the friction loading between said clutch shoe and said friction surface whereby a limited predetermined torque load is transmitted by said clutch.

5. A torque limiting clutch comprising a drum having an internal cylindrical surface, expandable clutch shoe means within said drum resiliently contacting said cylindrical surface, the resilience of said shoe means having a predetermined value, an actuator ring coupled to said shoe means for shrinking said shoe means against said resilience, said shrinking occurring upon expansion of said ring, an input hub, said hub having cam surfaces on its perimeter, said cam surfaces being symmetrical for either direction of rotation of said hub, rolling means coupling said input hub to said actuator ring, means rotatably mounting said hub for a torque input and means rotatably mounting said drum for a torque output whereby the output torque of said clutch is limited in magnitude in its transmission by said clutch.

6. A torque limiting clutch comprising a drum having an internal cylindrical surface, an expandable clutch shoe within said drum resiliently contacting said cylindrical surface, the resilience of said clutch shoe having a predetermined value, an actuator ring coupled to said clutch shoe, said actuator ring having a predetermined elastance, said actuator ring being coupled to said clutch shoe such that said shoe is shrunk upon expansion of said ring, an input hub, said hub having cam-like surfaces on its perimeter, said surfaces being symmetrical in either direction of rotation from a neutral point, rolling means, said rolling means coupling said input hub to said actuator ring, means mounting said hub for rotary input motion, and means mounting said drum for rotary output motion whereby the output torque of said clutch is limited in magnitude in its transmission to said drum from said hub through said rolling means, said actuator ring, and said clutch shoe.

References Cited in the file of this patent

UNITED STATES PATENTS

| | | |
|---|---|---|
| 620,916 | Hafner | Mar. 14, 1899 |
| 2,445,590 | Stephenson | July 20, 1948 |

FOREIGN PATENTS

| | | |
|---|---|---|
| 580,646 | France | Sept. 5, 1924 |